US011977539B1

(12) United States Patent
Jacobs

(10) Patent No.: US 11,977,539 B1
(45) Date of Patent: May 7, 2024

(54) SYSTEMS AND METHODS FOR GENERATION AND MANAGEMENT OF SQL DATA DEFINITION AND DATA MANIPULATION STATEMENTS VIA SERIALLY REUSABLE METADATA

(71) Applicant: SnowBuilder.io, LLC, Foster City, CA (US)

(72) Inventor: Jeffrey Myles Jacobs, Foster City, CA (US)

( * ) Notice: Subject to any disclaimer, the term of this patent is extended or adjusted under 35 U.S.C. 154(b) by 0 days.

(21) Appl. No.: 18/413,492

(22) Filed: Jan. 16, 2024

Related U.S. Application Data

(60) Provisional application No. 63/501,001, filed on May 9, 2023.

(51) Int. Cl.
*G06F 16/242* (2019.01)
*G06F 16/25* (2019.01)
(52) U.S. Cl.
CPC .......... *G06F 16/242* (2019.01); *G06F 16/258* (2019.01)

(58) Field of Classification Search
CPC .............................. G06F 16/242; G06F 16/258
See application file for complete search history.

(56) References Cited

U.S. PATENT DOCUMENTS

| 2004/0139061 A1* | 7/2004 | Colossi | G06F 16/283 |
| 2020/0004750 A1* | 1/2020 | Aldrich | G06F 16/2282 |

* cited by examiner

*Primary Examiner* — Cam Y T Truong
(74) *Attorney, Agent, or Firm* — Bryan Cave Leighton Paisner LLP

(57) ABSTRACT

This disclosure relates to improved techniques for generating SQL statements, including both DDL and DML statements. In certain embodiments, a relational metadata management system (RMMS) stores and maintains a metadata repository corresponding to one or more source databases. The RMMS can represent a SQL engine layer that is situated on top of a SQL engine and/or SQL database to facilitate higher levels of abstraction and reusability of the data included in the databases. The RMMS can include a SQL generator that utilizes the metadata stored in the metadata repository to generate the SQL statements for querying the one or more source databases.

16 Claims, 9 Drawing Sheets

| Target_Object_Name | Target Column | Column Order | Source Column Definition | Transformation Type | Source Object | Source Object Alias | Column Comment |
|---|---|---|---|---|---|---|---|
| VW_CUSTOMER_BASE | CustomerId | 1.01 | CustomerId | NAME | "CHINOOK"."CHINOOK_PHYSICAL_SCHEMA"."Customer" | NULL | Primary key IS 'account' number' |
| VW_CUSTOMER_BASE | FirstName | 2 | FirstName | NAME | "CHINOOK"."CHINOOK_PHYSICAL_SCHEMA"."Customer" | NULL | (null) |
| VW_CUSTOMER_BASE | LastName | 3 | LastName | NAME | "CHINOOK"."CHINOOK_PHYSICAL_SCHEMA"."Customer" | NULL | (null) |
| VW_CUSTOMER_BASE | Company | 4 | Company | NAME | "CHINOOK"."CHINOOK_PHYSICAL_SCHEMA"."Customer" | NULL | (null) |
| VW_CUSTOMER_BASE | Address | 5 | Address | NAME | "CHINOOK"."CHINOOK_PHYSICAL_SCHEMA"."Customer" | NULL | (null) |
| VW_CUSTOMER_BASE | City | 6 | City | NAME | "CHINOOK"."CHINOOK_PHYSICAL_SCHEMA"."Customer" | NULL | (null) |
| VW_CUSTOMER_BASE | State | 7 | State | NAME | "CHINOOK"."CHINOOK_PHYSICAL_SCHEMA"."Customer" | NULL | (null) |
| VW_CUSTOMER_BASE | Country | 8 | Country | NAME | "CHINOOK"."CHINOOK_PHYSICAL_SCHEMA"."Customer" | NULL | (null) |
| VW_CUSTOMER_BASE | PostalCode | 9 | PostalCode | NAME | "CHINOOK"."CHINOOK_PHYSICAL_SCHEMA"."Customer" | NULL | (null) |
| VW_CUSTOMER_BASE | Phone | 10 | Phone | NAME | "CHINOOK"."CHINOOK_PHYSICAL_SCHEMA"."Customer" | NULL | (null) |
| VW_CUSTOMER_BASE | Fax | 11 | Fax | NAME | "CHINOOK"."CHINOOK_PHYSICAL_SCHEMA"."Customer" | NULL | (null) |
| VW_CUSTOMER_BASE | Email | 12 | Email | NAME | "CHINOOK"."CHINOOK_PHYSICAL_SCHEMA"."Customer" | NULL | (null) |
| VW_CUSTOMER_BASE | SupportRepId | 13 | SupportRepId | NAME | "CHINOOK"."CHINOOK_PHYSICAL_SCHEMA"."Customer" | NULL | (null) |
| VW_INVOICE_BASE | InvoiceId | 1 | InvoiceId | NAME | "CHINOOK"."CHINOOK_PHYSICAL_SCHEMA"."Invoice" | NULL | (null) |
| VW_INVOICE_BASE | CustomerId | 2 | CustomerId | NAME | "CHINOOK"."CHINOOK_PHYSICAL_SCHEMA"."Invoice" | NULL | (null) |
| VW_INVOICE_BASE | InvoiceDate | 3 | InvoiceDate | NAME | "CHINOOK"."CHINOOK_PHYSICAL_SCHEMA"."Invoice" | NULL | (null) |
| VW_INVOICE_BASE | BillingAddress | 4 | BillingAddress | NAME | "CHINOOK"."CHINOOK_PHYSICAL_SCHEMA"."Invoice" | NULL | (null) |
| VW_INVOICE_BASE | BillingCity | 5 | BillingCity | NAME | "CHINOOK"."CHINOOK_PHYSICAL_SCHEMA"."Invoice" | NULL | (null) |
| VW_INVOICE_BASE | BillingState | 6 | BillingState | NAME | "CHINOOK"."CHINOOK_PHYSICAL_SCHEMA"."Invoice" | NULL | (null) |
| VW_INVOICE_BASE | BillingCountry | 7 | BillingCountry | NAME | "CHINOOK"."CHINOOK_PHYSICAL_SCHEMA"."Invoice" | NULL | (null) |
| VW_INVOICE_BASE | BillingPostalCode | 8 | BillingPostalCode | NAME | "CHINOOK"."CHINOOK_PHYSICAL_SCHEMA"."Invoice" | NULL | (null) |
| VW_INVOICE_BASE | Total | 9 | Total | NAME | "CHINOOK"."CHINOOK_PHYSICAL_SCHEMA"."Invoice" | NULL | (null) |

FIG. 2A

| Target Object Name | Target Column | Column Order | Source Column Definition | Transformation Type | Source Object | Source Object Alias | Column Comment |
|---|---|---|---|---|---|---|---|
| VW_CUSTOMER_NL | CUSTOMERID | 1.00 | CustomerId | NAME | "CHINOOK_VIEWS_DB"."CHINOOK_VIEWS_SCHEMA"."VW_CUSTOMER_BASE_ | NULL | Primary key for Customer data |
| VW_CUSTOMER_NL | First Name | 2.00 | FirstName | NAME | "CHINOOK_VIEWS_DB"."CHINOOK_VIEWS_SCHEMA"."VW_CUSTOMER_BASE_ | NULL | (null) |
| VW_CUSTOMER_NL | Last Name | 3.00 | LastName | NAME | "CHINOOK_VIEWS_DB"."CHINOOK_VIEWS_SCHEMA"."VW_CUSTOMER_BASE_ | NULL | (null) |
| VW_CUSTOMER_NL | Company | 4.00 | Company | NAME | "CHINOOK_VIEWS_DB"."CHINOOK_VIEWS_SCHEMA"."VW_CUSTOMER_BASE_ | NULL | (null) |
| VW_CUSTOMER_NL | Address | 5.00 | Address | NAME | "CHINOOK_VIEWS_DB"."CHINOOK_VIEWS_SCHEMA"."VW_CUSTOMER_BASE_ | NULL | (null) |
| VW_CUSTOMER_NL | City | 6.00 | City | NAME | "CHINOOK_VIEWS_DB"."CHINOOK_VIEWS_SCHEMA"."VW_CUSTOMER_BASE_ | NULL | (null) |
| VW_CUSTOMER_NL | State | 7.00 | State | NAME | "CHINOOK_VIEWS_DB"."CHINOOK_VIEWS_SCHEMA"."VW_CUSTOMER_BASE_ | NULL | (null) |
| VW_CUSTOMER_NL | Country | 8.00 | Country | NAME | "CHINOOK_VIEWS_DB"."CHINOOK_VIEWS_SCHEMA"."VW_CUSTOMER_BASE_ | NULL | (null) |
| VW_CUSTOMER_NL | Postal Code | 9.00 | PostalCode | NAME | "CHINOOK_VIEWS_DB"."CHINOOK_VIEWS_SCHEMA"."VW_CUSTOMER_BASE_ | NULL | (null) |
| VW_CUSTOMER_NL | Phone | 10.00 | Phone | NAME | "CHINOOK_VIEWS_DB"."CHINOOK_VIEWS_SCHEMA"."VW_CUSTOMER_BASE_ | NULL | (null) |
| VW_CUSTOMER_NL | Fax | 11.00 | Fax | NAME | "CHINOOK_VIEWS_DB"."CHINOOK_VIEWS_SCHEMA"."VW_CUSTOMER_BASE_ | NULL | (null) |
| VW_CUSTOMER_NL | Email | 12.00 | Email | NAME | "CHINOOK_VIEWS_DB"."CHINOOK_VIEWS_SCHEMA"."VW_CUSTOMER_BASE_ | NULL | (null) |
| VW_CUSTOMER_NL | SUPPORTREPID | 13.00 | SupportRepId | NAME | "CHINOOK_VIEWS_DB"."CHINOOK_VIEWS_SCHEMA"."VW_CUSTOMER_BASE_ | NULL | (null) |

FIG. 2B

| Target Object Name | Target Column | Column Order | Source Column Definition | Transformation Type | Source Object | Source Object Alias | Column Comment |
|---|---|---|---|---|---|---|---|
| VW_INVOICE_METRICS | Total Sales | 10 | Sum("Total") | EXPR | "CHINOOK_VIEWS_DB"."CHINOOK_VIEWS_SCHEMA"."VW_INVOICE_NL" | NULL | NULL |
| VW_INVOICE_METRICS | Avg. Invoice Sale | 11 | CAST(AVG("Total") AS NUMERIC(10,2) | EXPR | "VW_INVOICE_NL" | NULL | NULL |
| VW_INVOICE_METRICS | Largest Invoice Sale | 11 | MAX("Total") | EXPR | "VW_INVOICE_NL" | NULL | NULL |
| VW_INVOICE_METRICS | Smallest Invoice Sale | 11 | MIN("Total") | EXPR | "VW_INVOICE_NL" | NULL | NULL |
| VW_INVOICE_METRICS | INVOICEID | 1 | InvoiceId | IGNORE | "CHINOOK_VIEWS_DB"."CHINOOK_VIEWS_SCHEMA"."VW_INVOICE_NL" | NULL | Primary key for Invoice data |
| VW_INVOICE_METRICS | CUSTOMER ID | 2 | CustomerId | IGNORE | "CHINOOK_VIEWS_DB"."CHINOOK_VIEWS_SCHEMA"."VW_INVOICE_NL" | NULL | Foreign key for Customer data |
| VW_INVOICE_METRICS | Invoice Date | 3 | InvoiceDate | IGNORE | "CHINOOK_VIEWS_DB"."CHINOOK_VIEWS_SCHEMA"."VW_INVOICE_NL" | NULL | NULL |
| VW_INVOICE_METRICS | Billing Address | 4 | BillingAddress | IGNORE | "CHINOOK_VIEWS_DB"."CHINOOK_VIEWS_SCHEMA"."VW_INVOICE_NL" | NULL | NULL |
| VW_INVOICE_METRICS | Billing City | 5 | BillingCity | IGNORE | "CHINOOK_VIEWS_DB"."CHINOOK_VIEWS_SCHEMA"."VW_INVOICE_NL" | NULL | NULL |
| VW_INVOICE_METRICS | Billing State | 6 | BillingState | IGNORE | "CHINOOK_VIEWS_DB"."CHINOOK_VIEWS_SCHEMA"."VW_INVOICE_NL" | NULL | NULL |
| VW_INVOICE_METRICS | Billing Country | 7 | BillingCountry | IGNORE | "CHINOOK_VIEWS_DB"."CHINOOK_VIEWS_SCHEMA"."VW_INVOICE_NL" | NULL | NULL |
| VW_INVOICE_METRICS | Billing Postal Code | 8 | BillingPostalCode | IGNORE | "CHINOOK_VIEWS_DB"."CHINOOK_VIEWS_SCHEMA"."VW_INVOICE_NL" | NULL | NULL |
| VW_INVOICE_METRICS | Total | 9 | Total | IGNORE | "CHINOOK_VIEWS_DB"."CHINOOK_VIEWS_SCHEMA"."VW_INVOICE_NL" | NULL | NULL |

FIG. 2C

| Target Object Name | Target Column | Column Order | Source Column Definition | Transformation Type | Source Object | Source Object Alias | Column Comment |
|---|---|---|---|---|---|---|---|
| VW_CUSTOMER_INVOICE | CUSTOMERID | 1 | CUSTOMERID | NAME | "CHINOOK_VIEWS_DB"."CHINOOK_VIEWS_SCHEMA"."VW_CUSTOMER_NE" | CUST | Primary key for Customer data |
| VW_CUSTOMER_INVOICE | First Name | 2 | First Name | NAME | "CHINOOK_VIEWS_DB"."CHINOOK_VIEWS_SCHEMA"."VW_CUSTOMER_NE" | CUST | (null) |
| VW_CUSTOMER_INVOICE | Last Name | 3 | Last Name | NAME | "CHINOOK_VIEWS_DB"."CHINOOK_VIEWS_SCHEMA"."VW_CUSTOMER_NE" | CUST | (null) |
| VW_CUSTOMER_INVOICE | Company | 4 | Company | NAME | "CHINOOK_VIEWS_DB"."CHINOOK_VIEWS_SCHEMA"."VW_CUSTOMER_NE" | CUST | (null) |
| VW_CUSTOMER_INVOICE | Address | 5 | Address | NAME | "CHINOOK_VIEWS_DB"."CHINOOK_VIEWS_SCHEMA"."VW_CUSTOMER_NE" | CUST | (null) |
| VW_CUSTOMER_INVOICE | City | 6 | City | NAME | "CHINOOK_VIEWS_DB"."CHINOOK_VIEWS_SCHEMA"."VW_CUSTOMER_NE" | CUST | (null) |
| VW_CUSTOMER_INVOICE | State | 7 | State | NAME | "CHINOOK_VIEWS_DB"."CHINOOK_VIEWS_SCHEMA"."VW_CUSTOMER_NE" | CUST | (null) |
| VW_CUSTOMER_INVOICE | Country | 8 | Country | NAME | "CHINOOK_VIEWS_DB"."CHINOOK_VIEWS_SCHEMA"."VW_CUSTOMER_NE" | CUST | (null) |
| VW_CUSTOMER_INVOICE | Postal Code | 9 | Postal Code | NAME | "CHINOOK_VIEWS_DB"."CHINOOK_VIEWS_SCHEMA"."VW_CUSTOMER_NE" | CUST | (null) |
| VW_CUSTOMER_INVOICE | Phone | 10 | Phone | NAME | "CHINOOK_VIEWS_DB"."CHINOOK_VIEWS_SCHEMA"."VW_CUSTOMER_NE" | CUST | (null) |
| VW_CUSTOMER_INVOICE | Fax | 11 | Fax | NAME | "CHINOOK_VIEWS_DB"."CHINOOK_VIEWS_SCHEMA"."VW_CUSTOMER_NE" | CUST | (null) |
| VW_CUSTOMER_INVOICE | Email | 12 | Email | NAME | "CHINOOK_VIEWS_DB"."CHINOOK_VIEWS_SCHEMA"."VW_CUSTOMER_NE" | CUST | (null) |
| VW_CUSTOMER_INVOICE | SUPPORTREPID | 13 | SUPPORTREPID | NAME | "CHINOOK_VIEWS_DB"."CHINOOK_VIEWS_SCHEMA"."VW_CUSTOMER_NE" | CUST | (null) |
| VW_CUSTOMER_INVOICE | INVOICEID | 24 | INVOICEID | NAME | "CHINOOK_VIEWS_DB"."CHINOOK_VIEWS_SCHEMA"."VW_INVOICE_NE" | INV | Primary key for Invoice data |
| VW_CUSTOMER_INVOICE | Invoice Date | 26 | Invoice Date | NAME | "CHINOOK_VIEWS_DB"."CHINOOK_VIEWS_SCHEMA"."VW_INVOICE_NE" | INV | (null) |
| VW_CUSTOMER_INVOICE | Billing Address | 27 | Billing Address | NAME | "CHINOOK_VIEWS_DB"."CHINOOK_VIEWS_SCHEMA"."VW_INVOICE_NE" | INV | (null) |
| VW_CUSTOMER_INVOICE | Billing City | 28 | Billing City | NAME | "CHINOOK_VIEWS_DB"."CHINOOK_VIEWS_SCHEMA"."VW_INVOICE_NE" | INV | (null) |
| VW_CUSTOMER_INVOICE | Billing State | 29 | Billing State | NAME | "CHINOOK_VIEWS_DB"."CHINOOK_VIEWS_SCHEMA"."VW_INVOICE_NE" | INV | (null) |
| VW_CUSTOMER_INVOICE | Billing Country | 30 | Billing Country | NAME | "CHINOOK_VIEWS_DB"."CHINOOK_VIEWS_SCHEMA"."VW_INVOICE_NE" | INV | (null) |
| VW_CUSTOMER_INVOICE | Billing Postal Code | 31 | Billing Postal Code | NAME | "CHINOOK_VIEWS_DB"."CHINOOK_VIEWS_SCHEMA"."VW_INVOICE_NE" | INV | (null) |
| VW_CUSTOMER_INVOICE | Total | 32 | Total | NAME | "CHINOOK_VIEWS_DB"."CHINOOK_VIEWS_SCHEMA"."VW_INVOICE_NE" | INV | (null) |
| VW_CUSTOMER_INVOICE | CUSTOMERID | 25 | CUSTOMERID | IGNORE | "CHINOOK_VIEWS_DB"."CHINOOK_VIEWS_SCHEMA"."VW_INVOICE_NE" | INV | Foreign key for Customer data |

FIG. 2D

SYSTEMS AND METHODS FOR GENERATION AND MANAGEMENT OF SQL DATA DEFINITION AND DATA MANIPULATION STATEMENTS VIA SERIALLY REUSABLE METADATA

CROSS-REFERENCE TO RELATED APPLICATIONS

This application claims benefit of, and priority to, U.S. Provisional Patent Application No. 63/501,001 filed on May 9, 2023. The content of the above-identified application is herein incorporated by reference in its entirety.

TECHNICAL FIELD

This disclosure relates to the generation and manipulation of SQL (structure query language) data definition language (DDL) and data manipulation language (DML) statements which are used to query databases. In some examples, the systems and methods described herein enable a user to easily create sophisticated SQL DDL and DML statements in a consistent, reliable and repeatable manner.

BACKGROUND

Manually creating complex SQL SELECT based DDL and DML is labor intensive, error prone and expensive. Copy/paste/modify script cycles produce inconsistent results. The results are difficult to reuse as building blocks for more complex SQL objects and DML. Data modeling tools require an equivalent level of effort.

Presentation naming and business logic/semantics are typically "hard coded" in business intelligence (BI) tools resulting in vendor lock-in and expensive "per seat pricing", and inability to reuse presentation and business logic/semantics across BI/AI/ML products.

Existing technologies that generate DDL and DML include data modeling tools, Extract/Load/Transform (ELT) offerings, Extract/Transform/Load offerings (ETL) and SQL development tools with query builder functionality. While these technologies often use underlying metadata repositories, their repositories are hidden and contained within the product/tool. They do not support multiple, extensible repositories.

The reusability of metadata with existing tools is quite limited. Also, ELT/ETL tools focus on physical transformation of persisted data, with limited VIEW generation. They generally do not generate DDL or DML. Also, data modeling tools are tightly coupled with a single physical source of the metadata repository, typically a proprietary file format or a self-contained SQL database. Each SQL object to be generated has its own set of metadata. In other words, the same set of metadata used to generate DDL for a SQL CREATE VIEW cannot directly be used to generate a SELECT statement or a CREATE TABLE statement. Defining VIEW typically requires either directly writing the appropriate query, or manually defining each part of the VIEW.

The primary means of creating VIEWs is manual creation and editing of scripts. Manual creation and editing of informative, user friendly mixed case column names with spaces is error prone and labor intensive. Ensuring consistent and reliable naming, comments on Columns, and consistent functional logic is difficult due to "copy/paste/edit" cycles. Additionally, COLUMN COMMENTs on VIEWs are frequently ignored due to the additional labor required.

Data modeling tools provide limited support for creating VIEWs. This support typically requires extensive manual work, tool specific technical knowledge and per user pricing. The metadata is maintained in the modeling tool's repository and is typically only available to a very limited number of users.

ETL/ELT tools primarily perform physical data transformation, either prior to loading into the database or after data is loaded. The result is persistent data objects. However, useful metadata such as column comments are not processed.

These existing technologies require scheduled execution of jobs, with attendant monitoring, failure detection, etc. They generally require specific, specialized expertise to utilize these tools. The ability to generate DDL and DML statements is limited. Their pricing is typically on a per seat basis, as well as additional runtime and performance charges.

BRIEF DESCRIPTION OF THE DRAWINGS

To facilitate further description of the embodiments, the following drawings are provided, in which like references are intended to refer to like or corresponding parts, and in which:

FIG. 2A illustrates content of an exemplary metadata repository in accordance with certain embodiments;

FIG. 2B illustrates content of another exemplary metadata repository in accordance with certain embodiments;

FIG. 2C illustrates content of another exemplary metadata repository in accordance with certain embodiments;

FIG. 2D illustrates content of another exemplary metadata repository in accordance with certain embodiments;

DETAILED DESCRIPTION OF EXEMPLARY EMBODIMENTS

Figure 1A:
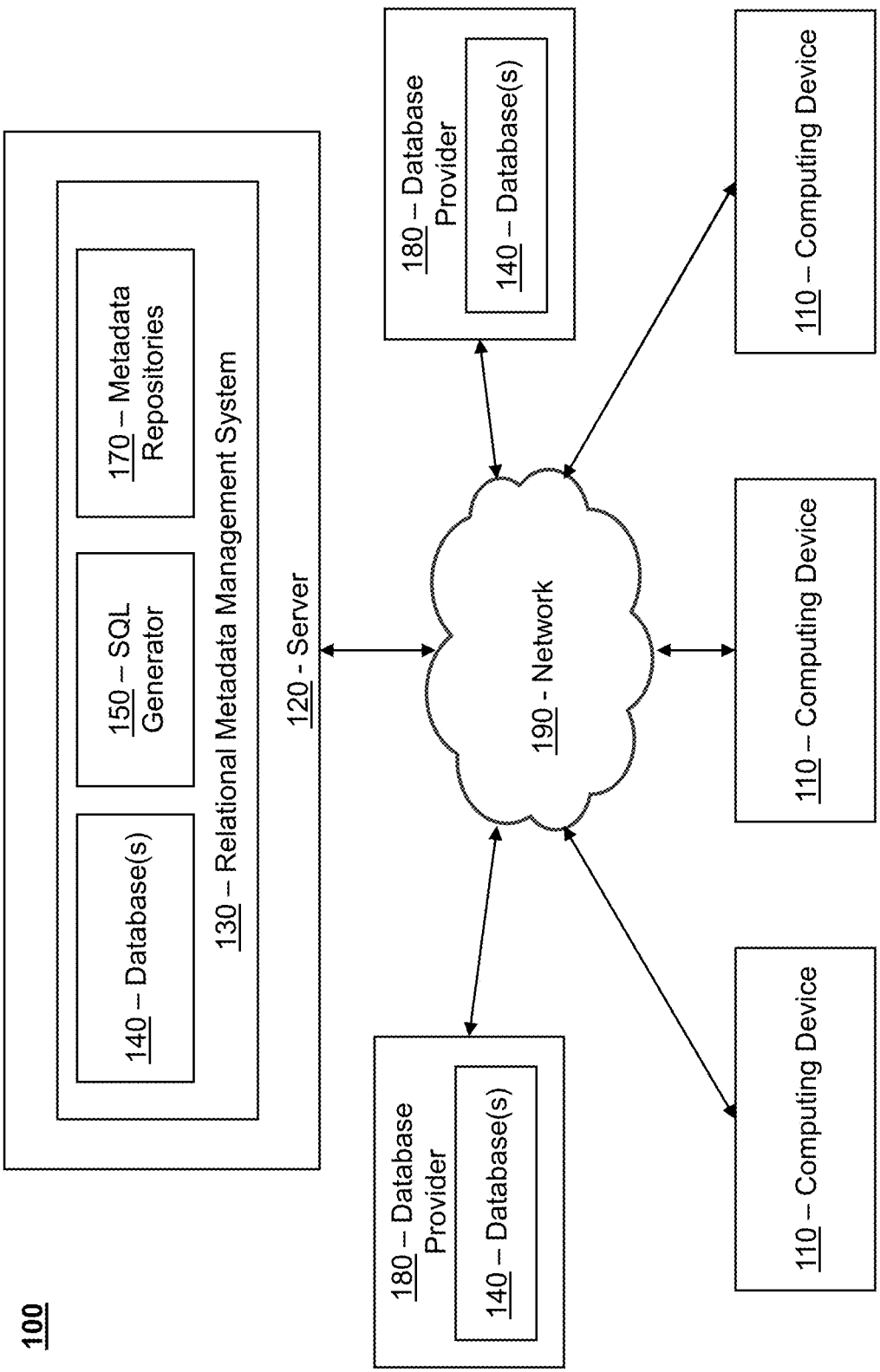
FIG. 1A is a block diagram of an exemplary system for generating SQL statements in accordance with certain embodiments.

The present disclosure relates to improved systems, methods, apparatuses, computer program products, and techniques for generating SQL Data Definition Language (DDL) and SQL Data Manipulation (DML) statements. In some embodiments, a relational metadata management system (RMMS) comprises a metadata repository that stores metadata derived from one or more source databases, and a SQL generator configured to generate the SQL DDL and DML statements in a consistent, reliable, and repeatable manner using the metadata in the repository. While syntaxes for different databases systems can vary, the relational metadata management system can be adapted to output DDL and DML statements for any type of database system.

In certain embodiments, the relational metadata management system can generate or create metadata repositories based on metadata extracted from one or more source databases. These metadata repositories can store metadata for tables, views, materialized views, and/or other objects that are derived or generated based on transformations performed on source objects included in the one or more source databases. Various types of transformations can be applied to generate the metadata including, but not limited to, the object transformations, name transformations, semantic transformations, and constant transformations described below. The relational metadata management system can include a SQL generator that utilizes the transformed objects' metadata stored in the metadata repositories to generate DDL and DML statements for querying and/or creating objects in the one or more source databases.

In certain embodiments, the SQL generator is configured to generate SQL DDL statements and/or SQL DML statements by executing a programmatic process on a metadata repository, which comprises metadata derived and/or transformed from one or more source databases (e.g., such as third-party vendor databases and/or other databases). Depending on the language implementation, this can include executing SQL SELECT statements, function calls, method invocations and/or the like on the metadata included in the repository. A data model associated with the metadata repository organizes or manages the metadata gleaned or extracted from the one or more databases in manner than enables complex SQL DDL and DML statements to be generated in a rapid and efficient manner. The DDL and DML outputs produced by the disclosed techniques places the presentation and business logic/semantic in the relational database management system (RDBMS). This enables reusability of the DDL and DML outputs across business intelligence (BI), artificial intelligence (AI), and machine learning (ML) tools.

One benefit of the disclosed techniques is to enable the creation of sophisticated, VIEW-based analytic architectures by consistent, reliable generation of VIEWs built by referencing other VIEWs and/or other RDBMS objects.

SQL VIEWs provide the following benefits:
1. VIEWs simplify complex queries by abstracting away the underlying table structures presenting the data in a way that is easier to understand and use.
2. VIEWs reduce redundant code by encapsulating commonly used queries into a single reusable query.
3. VIEWs may enhance security by restricting sensitive data access to authorized users.
4. VIEWs provide an abstraction layer between the application and the physical database objects. making it easier to change the underlying physical database structure.
5. VIEWs can improve performance by precomputing complex queries and storing the results in the VIEW. This can reduce the number of computations that need to be performed at runtime, resulting in faster query times.

Building a layered VIEW architecture can provide the following benefits:
1. Building SQL VIEWs based on other SQL VIEWs provides a more efficient and scalable way to work with complex data structures. It simplifies queries, improves reusability and maintainability, enhances security and performance.
2. Building SQL VIEWs based on other SQL VIEWs simplifies complex queries by abstracting away even more complexity. This results in a more simplified VIEW that can be used in queries. This makes it easier to work with complex data structures by reducing the amount of code required to retrieve the data.
3. Building SQL VIEWs based on other SQL VIEWs enables creation of libraries of reusable VIEWs. This saves time and effort when developing new queries or reports.

Another benefit provided by the relational metadata management system is the ability to generate SELECT and other DML directly from the repository—that is, a database object need not be created to use an object transformation to generate DML. A database object may be created from an object transformation if is to be used as a source object. In particular, generated SELECT statements include all of the target column names, eliminating the issues with SELECT * statements. The resulting statement need not be stored outside the repository. The resulting statement may be edited and modified if needed. Object transformations provide the same functionality as SQL VIEWs, in many cases eliminating the need to create a database object.

Further, the disclosed techniques support the use of multiple metadata repositories. The programmatic process may use any metadata repository in any supported format.

Another advantage of the relational metadata management system relates is the use of serially reusable metadata for the generation of SQL DDL and DML statements with reliable, reusable column lists and SQL SELECT statements. For example, a first set of target objects initially may be derived from metadata corresponding to source objects included in a source database (or multiple source databases), and the first set of target objects can be utilized to generate a first set of SQL statements for querying the source database. Thereafter, a second set of target objects may derived from the metadata stored for first set of target objects, and the second set of target objects can be utilized to generate a second set of SQL statements. Additional object layers can be built on top of the second set of target objects as desired. This layered reusability of metadata provides various benefits, including increased productivity, reliability, consistency and usability of SQL DDL and DML.

The disclosed techniques are not limited to the generation of SQL CREATE VIEW or SELECT statements. Rather, the techniques can be applied to generate any type of DDL or DML statement.

In the disclosed techniques, a user executes a programmatic process with appropriate options and context to generate the desired SQL Statements. The SQL Statement is returned via the call—however, it is not executed.

The disclosed techniques define a modular, "decoupled" approach for the generation of desired SQL Statements. The programmatic process is independent of the desired metadata repository.

The column list and the columns in the resulting SQL statements can be generated via defined transformation types and appropriate metadata included in the metadata repositories.

The disclosed techniques do not transform persisted data. The transformation is "virtual"; the transformation of data is the result of executing calls to the generated SQL DDL objects or SQL DML queries.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
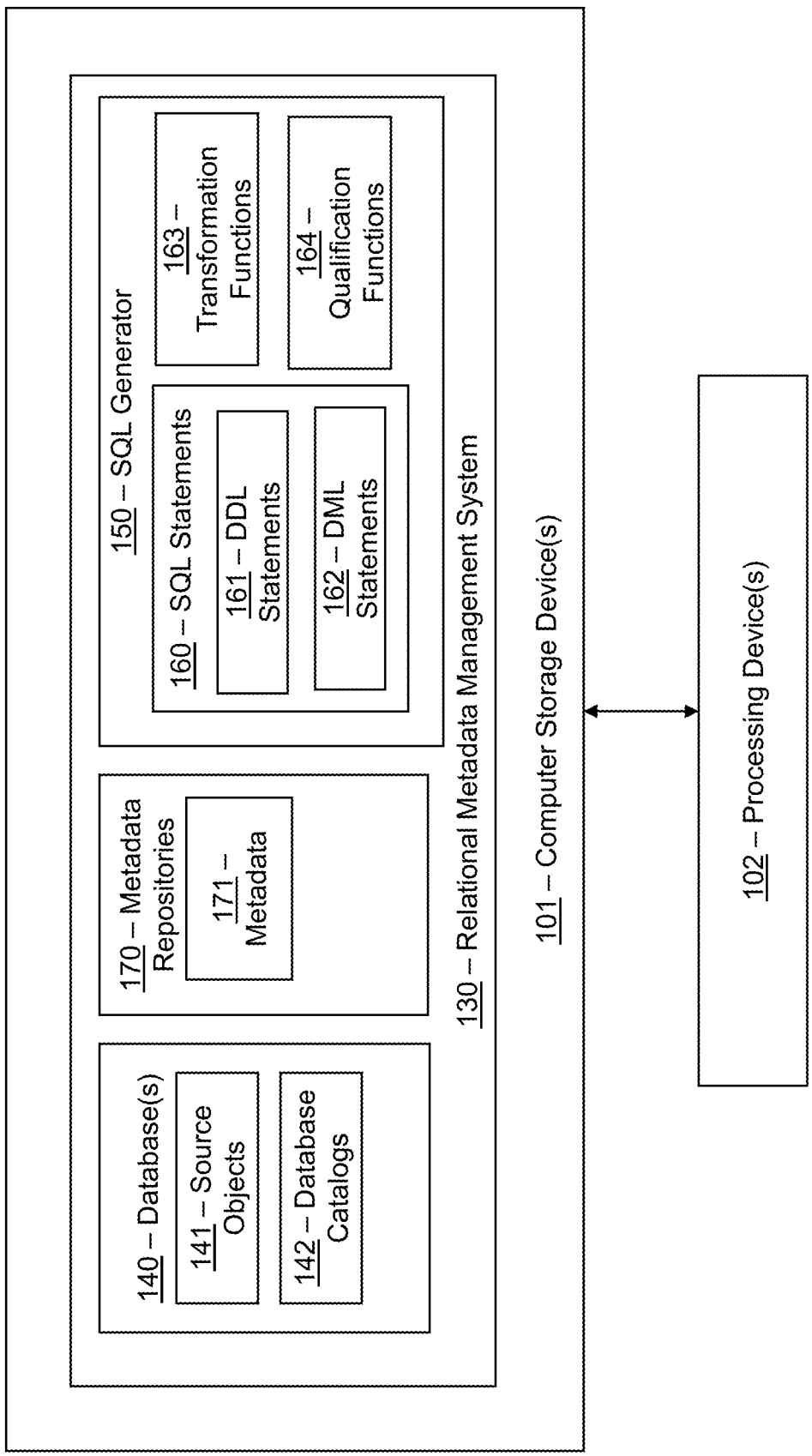
FIG. 1B is a block diagram demonstrating exemplary feature of a query generation system in accordance with certain embodiments.

FIG. 1A is a diagram of an exemplary system 100 in accordance with certain embodiments. FIG. 1B is a diagram illustrating exemplary features and/or functions associated with a relational metadata management system 130. FIGS. 1A-1B are discussed jointly below.

The system 100 comprises one or more computing devices 110, one or more servers 120, and one or more database providers 180 that are in communication over a network 190. A relational metadata management system (RMMS) 130 is stored on, and executed by, the one or more servers 120. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated FIG. 1A, including the computing devices 110, servers 120, database providers 180, and relational metadata management system 130 can be configured to communicate directly with each other and/or over the network 190 via wired or wireless communication links, or a combination of the two. Each of the computing devices 110, servers 120, database providers 180, and relational metadata management system 130 can include one or more communication devices, one or more computer storage devices, and one or more processing devices that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices 101 including, but not limited to, instructions associated with executing the functionalities of the relational metadata management system 130 and/or the components of the SQL generator 150.

The one or more computer storage devices may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the storage devices may be physical, non-transitory mediums. The one or more computer storage devices can store instructions associated with executing functionalities of the relational metadata management system 130 and/or the SQL generator 150.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable the computing devices 110, server(s) 120, and/or relational metadata management system 130 to be connected to the Internet and/or other networks. The modem devices can permit bi-directional communication between the Internet (and/or other network) and the computing devices 110, server(s) 120, and/or relational metadata management system 130. In certain embodiments, one or more router devices and/or access points may enable the computing devices 110, server(s) 120, and/or relational metadata management system 130 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, server(s) 120, and/or relational metadata management system 130 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the computing devices 110 mentioned above. The one or more servers 120 also can comprise one or more mainframe computing devices and/or one or more virtual servers that are executed in a cloud-computing environment. In some embodiments, the one or more servers 120 can be configured to execute web servers and can communicate with the computing devices 110 and/or other devices over the network 190 (e.g., over the Internet).

In certain embodiments, the relational metadata management system 130 can be stored on, and executed by, the one or more servers 120. In some embodiments, the relational metadata management system 130 (or SQL generator 150) also can be provided as a software-as-a-service (SaaS) offering that is hosted on one or more servers 120. Additionally, or alternatively, the relational metadata management system 130 (or certain components of the relational metadata management system 130) can be stored on, and executed by, the one or more computing devices 110. The relational metadata management system 130 can be stored on, and executed, by other devices as well.

In some embodiments, the relational metadata management system 130 (or SQL generator 150) also can be stored as a local application on a computing device 110, or integrated into the software code of a local application stored on a computing device 110, to implement the techniques and functions described herein. In some embodiments, the relational metadata management system 130 (or SQL generator 150) can be included in a software package that is made available via a code hosting platform and/or other third-party platform, and the software package can be accessed by software developers to assist with developing code that interacts with one or more databases 140. In some examples, the software package can be imported into scripts or applications to assist developers with generating SQL statements 160. In certain embodiments, the relational metadata management system 130 (or SQL generator 150) can be integrated with (or can communicate with) various applications including, but not limited to, database applications (e.g., such as relation database management systems and/or other database systems), and/or other applications that are stored on a computing device 110 and/or server 120. The functionalities of the relational metadata management system 130 (or SQL generator 150) can be provided using other techniques as well.

In certain embodiments, the one or more computing devices 110 can enable individuals to access the relational metadata management system 130 (or SQL generator 150) over the network 190 (e.g., over the Internet). In some examples, a user can create an account with the relational metadata management system 130 to access the functionalities of the relational metadata management system 130 described herein.

Various entities (e.g., companies, organizations, individuals, etc.) may store their data or information in one or more databases 140 (or source databases). In some scenarios, the databases 140 may be stored and/or maintained by database providers 180 that provide functionalities such as data warehousing, data hosting, and/or database management services. Examples of database providers 180 that host databases 140 can include Snowflake®, Microsoft Azure®, IBM Db2®, etc. In these scenarios, the databases 140 may correspond to vendor databases and/or third-party databases that are stored external to the relational metadata management system 130. In other scenarios, the databases 140 may represent proprietary databases that are stored and/or maintained directly by a company, organization, or other entity. In further scenarios, the databases 140 may be stored and/or maintained directly by the relational metadata management system 130.

Each of the databases 140 can store various types of data and information. Additionally, a given database 150 may store one or more source objects 141 (e.g., such as include tables, indexes, user-defined types, etc.) to organize or arrange the data and information included in the database 140. In some cases, the databases 140 may store, or provide access to, database catalogs 142 that include metadata describing the structures, schemas, organizations, properties, and/or source objects 141 of the databases 140.

As explained above, traditional database systems or providers are plagued with various deficiencies, and creating complex SQL statements 160 (e.g., such as DDL and DML statements) to query the databases relies largely on manual efforts, which can be labor intensive, error prone and expensive.

The relational metadata management system 130 can be configured with various functionalities for overcoming these and other deficiencies of traditional database providers 180 and/or database systems. In some embodiments, the relational metadata management system 130 can represent a SQL engine layer that is situated on top of a SQL engine and/or SQL database to facilitate higher levels of abstraction and reusability of the data included in the databases 140. Amongst other things, the relational metadata management system 130 enables users (e.g., software developers, database managers, etc.) to rapidly create complex SQL statements, including both DDL statements 161 and DML statements 162, for querying data associated with databases 140 and/or the metadata repositories 170 derived from the databases 140. As explained below, these SQL statements 160 can be generated, at least in part, by leveraging metadata repositories 170 maintained on, or accessed by, the metadata management system 130.

In certain embodiments, the relational metadata management system 130 (or SQL generator 150) can initially generate or create metadata repositories 170 for one or more source databases 140 for which querying is desired. Each metadata repository 170 can comprise various types of metadata 171 associated with the databases 140 and/or source objects 141 included within the databases 140. In some embodiments, the relational metadata management system 130 may initially communicate with each database 140 to obtain or extract the metadata 171 (e.g., database names or identifiers, database schemas, source objects 141 included in the database 140, column names associated the source objects 141, constraints on the source objects 141 or database 140, and/or other types of metadata) for creating a metadata repository 170 corresponding to the database 140. In some cases, an authorized user may be required to specify login credentials (e.g., username and password) to enable the relational metadata management system 130 to access the source databases 140 and/or metadata associated with the target databases 140.

In some scenarios, the metadata repository 170 may represent a collection of metadata 171 that is stored externally or remotely with respect to a corresponding database 140, and which is maintained independently by the relational metadata management system 130. In other scenarios, such as those in which the source databases 140 are maintained or hosted by the relational metadata management system 130, the metadata repository 170 can be stored locally on the relational metadata management system 130 and/or directly within the source databases 140.

In some examples, some or all of the metadata 171 utilized to create the metadata repository 170 can be extracted or obtained from a database catalog 142 (or data dictionary) associated with the database 140. The metadata associated with the database 140 can be extracted using other techniques as well. Over time, the metadata 171 associated with the database 140 may be modified or updated. In these scenarios, the metadata repository 170 can be updated to account for the modifications or updates.

The form or configuration of a metadata repository 170 can vary. In some examples, a metadata repository 170 can include persisted physical database objects including metadata 171 that is extracted from one or more source databases 140. In some examples, the metadata 171 included in the repositories can be logically referenced either directly or indirectly as rows, with a minimum set of columns required for generation. Exemplary metadata repository database object types may include, but are not limited to following:
  Permanent TABLEs
  Transient TABLEs
  Hybrid/Unistore TABLEs
  External TABLEs
  Files in file systems
  ICEBERG TABLEs
  Dynamic TABLEs
  Columnar data store
  Key value field pairs It should be understood that there is no inherit limit to the number or size of the metadata repositories 170 or the number of users who may create and use metadata repositories other than those imposed by policies enforced by the embodiment. Additionally, a given metadata repository 170 can be comprised of multiple repositories 170 and/or can comprise multiple database objects in some instances. In many embodiments, a metadata repository 170 may arranged to include structured data and/or semi-structured data. Moreover, it should be understood that the term "column" and "field" can be equivalent if the metadata repository 170 is arranged in a semi-structured or key-value pair configuration.

The metadata repositories 170 stored and maintained by the relational metadata management system 130 can include various types of content or data. In some instances, the metadata repositories 170 can store the original or raw metadata content obtained from source databases (e.g., which may include the metadata obtained from corresponding database catalogs 142). Additionally, the metadata repositories 170 can include metadata derived or transformed from source objects 141 included in the databases 140.

In some examples, the relational metadata management system 130 executes one or more transformation functions 163 that are configured to generate metadata 171 to be included in a given metadata repository 170. The metadata repository 170 may store metadata 171 identifying the types of transformation functions 163 that are performed on source objects 141 included in a source database 140.

In some examples, the transformation functions 163 can include an "object transformation function" which identifies or defines a logical set of rows and/or columns that are subsequently utilized for the generation of SQL statements 160. For example, the object transformation can define column transformations performed between the target columns in the SQL statement 160 to be generated and a column definition for a source object 141.

The transformation functions 163 also can apply various transformation types to generate metadata 171 to be included in metadata repository 170. Examples of transformation types that can be applied include, but are not limited to, name transformations, semantic transformations, and constant transformations. Each of these are described below.

In general, a "name transformation" can transform the column name(s) of a source object 141 to a target column name(s), and corresponding metadata 171 related to this transformation may be stored in the metadata repository 170. Table 1 (below) illustrates exemplary metadata table columns for a name transformation.

TABLE 1

| Targe Column Name | Transformation Type | Source Column Definition |
|---|---|---|
| Employee ID | NAME | EMP_ID |

In this above example, the SQL generator 150 can produce a string or fragment to be included in a SQL statement 160 as follows: EMP_ID AS "Employee ID".

In general, a "semantic transformation" can transform the contents of a source column definition to a target column name, and corresponding metadata 171 related to this transformation may be stored in the metadata repository 170. Table 2 (below) illustrates exemplary metadata table columns for a semantic transformation.

TABLE 2

| Target Column Name | Transformation Type | Source Column Definition |
|---|---|---|
| Order Sales Total | Semantic | SUM(QTY*SALES_PRICE) |

In the above example, the SQL generator 150 can produce a string or fragment to be included in a SQL statement 160 as follows: SUM(QTY*SALES_PRICE) AS "Order Sales Total".

In general, a "constant transformation" can transform the content (e.g., a constant) of a source column definition of a source object 141 to a target column name, and corresponding metadata 171 related to this transformation may be stored in the metadata repository 170. Note that the Source Column Definition data type is a string in the example below. However, there can multiple constant transformation types other than strings. The following example produces a true numeric column type in the resulting SQL fragment.

TABLE 3

| Target Column Name | Transformation Type | Source Column Definition |
|---|---|---|
| PI | Semantic | 3.14 |

In the above example, the SQL generator 150 can produce a string or fragment to be included in a SQL statement 160 as follows: 3.14 as PI.

The above examples describing name transformations, semantic transformations, and constant transformations are not intended to be limiting and it should be understood that many other types of object transformation functions 163 can be applied. For example, in some embodiments, the object transformation functions 163 can be supplemented with additional transform types, such as those which add functionality providing descriptions, instructions, and/or documentation for columns.

In certain embodiments, in addition to implementing transformations, the SQL generator 150 also can perform qualification functions 164 on the metadata and/or columns stored in the metadata repository 170. In general, the qualification functions 164 ensure that the metadata and/or columns included in the metadata repository 170 are fully specified with appropriate names, identifiers, and/or paths to ensure their unambiguous identification.

In some examples, the metadata can be qualified by prepending the metadata with content identifying a database name, schema name, and/or object name (e.g., "[database_name].<schema_name>.<object_name>"). Along similar lines, column qualification can be performed by prepending a column name as either:
1. [database_name].[schema_name].<object_name>.<column_name>; OR
2. <SQL Table Aliase>.<column_name>

TABLE 4

| Targe Column Name | Transformation Type | Source Column Definition | Source Object Alias | Source Object |
|---|---|---|---|---|
| Employee ID | NAME | EMP_ID | NULL | EMP |

In the above example, the qualification functions 164 can cause the SQL generator 150 to produce a string or fragment to be included in a SQL statement 160 as follows: EMP.EMP_ID AS "Employee ID.

TABLE 5

| Targe Column Name | Transformation Type | Source Column Definition | Source Object Alias | Source Object |
|---|---|---|---|---|
| Employee ID | NAME | EMP_ID | EMPL | EMP |

In the above example (which includes a source object alias), the qualification functions 164 can cause the SQL generator 150 to produce a string or fragment to be included in a SQL statement 160 as follows: EMPL.EMP_ID AS "Employee ID.

As explained throughout this disclosure, the metadata 171 stored in the metadata repository 170 can be leveraged by the SQL generator 150 of the relational metadata management system 130 to generate various types of SQL statements 160, and the metadata 171 can be reused serially over time.

The SQL generator 150 can comprise software instructions that are configured to assist software developers with generating SQL statements 160 in a consistent, reliable and repeatable manner. The SQL statements 160 generated by the SQL generator 150 can be executed to query databases 140 and/or create new objects in the databases 140.

The SQL generator 150 can generate various types of SQL statements 160 including, but not limited to, DDL statements 161 and DML statements 162. In general, the DDL statements 161 generated by the SQL generator 150 can be utilized to define and/or manage the structure of a database 140, and can comprise statements for managing the creation, modification, and/or deletion of database objects 141 such as tables, indexes, and views. The DML statements 162 generally can be utilized for manipulating the data stored in the database 140, and can comprise statements for performing operations associated with retrieving data, adding new data, modifying existing data, and/or removing data from the database 140.

Examples of DDL statements 161 that can be generated by the SQL generator 150 can include:
1. CREATE Statements: Statements that can be executed to create database objects, such as tables, views, materialized VIEWs and other queryable database objects.
2. ALTER Statements: Statements that can be executed to modify the structure of an existing database object, such as adding or removing columns from a table.
3. DROP Statements: Statements that can be executed to delete a database object, such as a table or an index.
4. TRUNCATE Statements: Statements that can be executed to remove all records from a table, but retain the table structure for future use.

Examples of DML statements 162 that can be generated by the SQL generator 150 can include:
1. INSERT Statements: Statements that can be executed to add new rows of data into a table or other persisted database object types.
2. UPDATE Statements: Statements that can be executed to modify existing data in a table or other persisted database object types.
3. DELETE Statements: Statements that can be executed to delete or remove data from a table or other persisted database object types based on specified conditions.
4. SELECT Statements: Statements that can be executed to retrieve data from one or more queryable database objects (e.g., TABLES, VIEWs, and/or other object types) based on specified conditions.
5. MERGE or UPSERT Statements: Statements that can be executed to update existing data in table or other persisted database object types and/or add new data into a table. or other persisted database object types The SQL generator 150 can be utilized to generate other types of DDL statements 161 and DML statements 162 as well.

FIG. 2A illustrates the contents of an exemplary metadata repository 170 in accordance with certain embodiments. In this example, the metadata repository 170 stores metadata 171 for defining or creating two target objects (e.g., VW_CUSTOMER_BASE and VW_INVOICE_BASE) using metadata extracted from pre-existing database tables (Customer and Invoice). The metadata repository 170 also stores metadata 171 that defines name transformations that are performed on source objects 141 to define or create columns for the target objects.

FIG. 2B illustrates the contents of another exemplary metadata repository 170 in accordance with certain embodiments. In this example, the metadata repository 170 stores metadata 171 for defining a target object (e.g., VW_CUSTOMER_NL) using the target_object metadata defined (e.g., VW_CUSTOMER_BASE) in FIG. 2A as the source_object defining name transformations that map source column definitions to target columns with new column names (e.g., "FirstName" to "First Name" associated with the target object). This is one example of how target objects previously created and stored in a metadata repository 170 can be reused and leveraged to define new or additional target objects.

FIG. 2C illustrates the contents of another exemplary metadata repository 170 in accordance with certain embodiments. In this example, metadata for a target object (e.g., VW_INVOICE_METRICS) is defined using modified metadata from a previously created target_object's (e.g., VW_INVOICE_NL) metadata. The metadata for source objects is used to generate four new target columns (e.g., "Total Sales", "Avg Invoice Sale", "Largest Invoice Sale", and "Smallest Invoice Sale") with SQL aggregation expressions with Transformation Type "EXPR". The target columns from VW_INVOICE_ML are modified columns with transformation type that do not result in generated column (e.g., Transformation Type "IGNORE"). This serial reusability of the metadata provides the user with additional metadata for modifying and enhancing=SQL statements 160 that are generated by the RMMS 130, such as SELECT statements and/or other similar DML statements.

FIG. 2D illustrates the contents of another exemplary metadata repository 170 in accordance with certain embodiments. In this example, metadata for a target_object (e.g., VW_CUSTOMER_INVOICE) with SQL JOINs using metadata from previously defined target objects (e.g., VW_CUSTOMER_NL and VW_INVOICE_NL) objects as metadata for source objects and utilizing Source Object Aliases (e.g., "OUST" and "INV").

The SQL generator 150 can utilize the information in a desired metadata repository 170 to generate strings or fragments for SQL statements 160. For example, in some instances, the set of columns or fields that can be used for generating SQL statements 160 can include:
1. Column containing the Target Object Name. STRING/VARCHAR/CHAR, referred to as Target Object Name
2. Column containing the name of the column to be generated (STRING/VARCHAR/CHAR), referred to as "Target Column"
3. Column containing the order of the generated column (NUMERIC) in the resulting SQL Statement, referred to as "Column Order"
4. Column containing the Source Column Definition for the resulting Target Column. Result is interpreted based on the Transformation Type.
5. Column containing the type of transformation/generation to be applied for the generated column (STRING/VARCHAR/CHAR), referred to as Transformation Type
6. Column containing the name of the database source object. The name may be fully, partially, unqualified. Referred to as "Source object".
7. Column containing an alias for the Database source object to support multiple usages of the Database source object's column in the generated DDL/DML where applicable (STRING/VARCHAR/CHAR), referred to as "Source Object Alias".
8. Column containing comment/description for the SQL COLUMN COMMENT in generated SQL Statement (STRING/VARCHAR/CHAR), referred to as "COLUMN Comment".

Additional columns may be added to the metadata repositories 170 to enable additional features, capabilities, and ease of use, e.g., FROM_CLAUSE and POST_FROM clause strings, data masking, informational metadata, etc.

In certain embodiments, generating DDL statements 161 and DML statements 162 from metadata stored in metadata repositories 170 can include specifying or setting the context for the metadata to be used. The context may be:
Directly accessing the metadata stored in one or more metadata repositories and/or repository objects; and/or
Indirectly accessing the metadata stored in one or more metadata repositories or one or more repository objects by executing a SQL VIEW statement(s) or other valid SQL statement(s) on the one or more metadata repositories or the one or more repository objects.

The use of metadata context provides a distributed or federated metadata repository architecture, i.e., a virtual metadata repository. This usage enables unique governance and self-service capabilities to the end user.

Metadata included in a metadata repository 170 may be obtained or sourced from one or more of the following:
Database object definitions (e.g., from source objects 151)
Information schema
SQL statements or queries, e.g., DESCRIBE commands
Metadata repositories
Manually created metadata
Metadata extracted from other tools such as business intelligence tools
Other sources of metadata suitable for use in a metadata repository In some examples, metadata repositories (and/or specified contexts) are the primary source of metadata, providing the ability to create and manage data within the repositories for creating new SQL DDL and DML statements based on previously defined repository object transformation definitions. This provides a high degree of reusability and reliability for building complex database queries and query-based objects.

Figure 3:
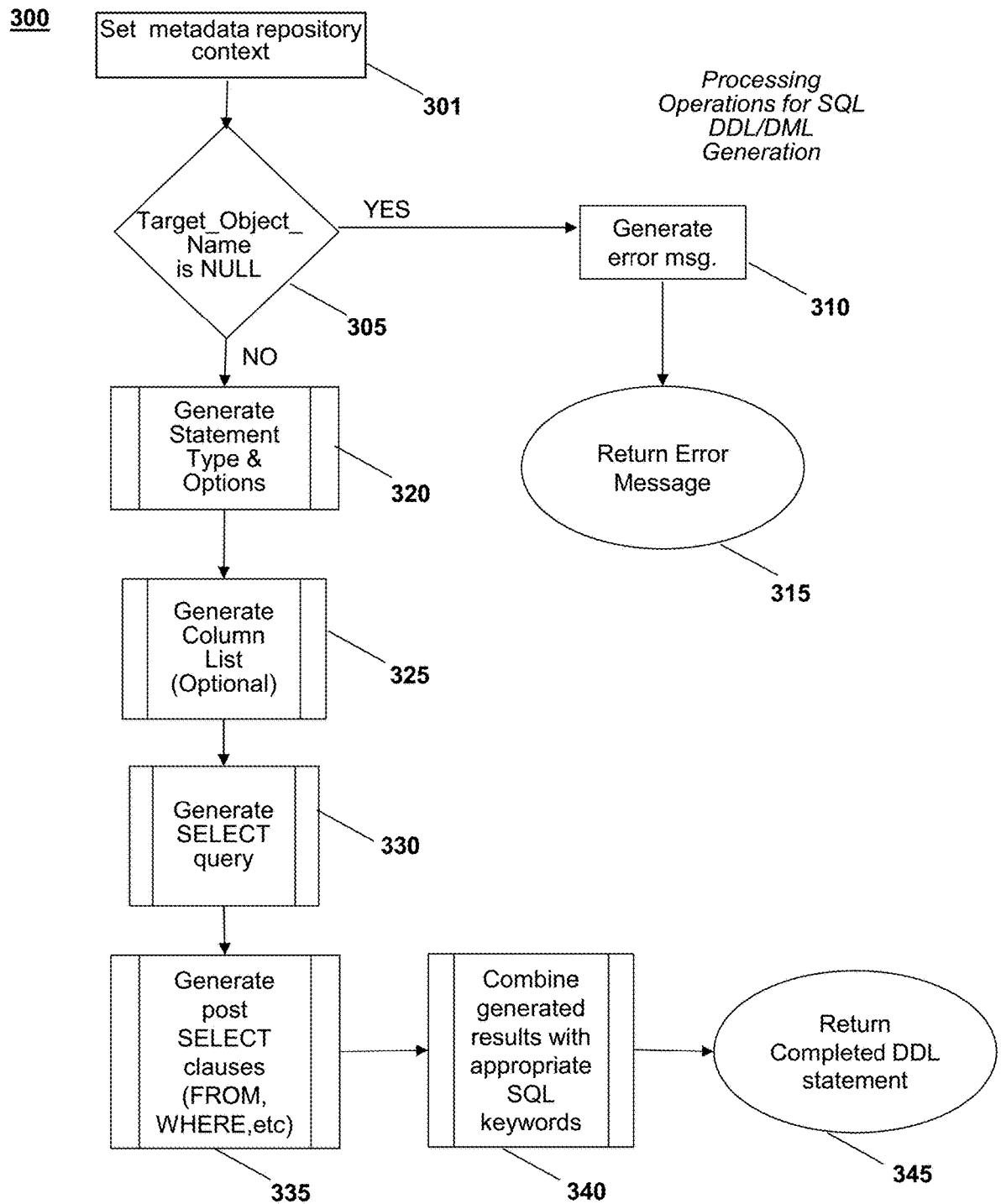
FIG. 3 is a flow chart illustrating an exemplary method for generating a SQL DDL or DML statements according to certain embodiments.

FIG. 3 illustrates a flow chart for an exemplary method 300 for generating SQL statements 160, such as DDL statements 161 and/or DML statements 162, according to certain embodiments. Method 300 is merely exemplary and is not limited to the embodiments presented herein. Method 300 can be employed in many different embodiments or examples not specifically depicted or described herein. In some embodiments, the steps of method 300 can be performed in the order presented. In other embodiments, the activities of method 300 can be performed in any suitable order. In still other embodiments, one or more of the steps of method 300 can be combined or skipped. In many embodiments, system 100, relational metadata management system 130, and/or SQL generator 150 can be configured to perform method 300 and/or one or more of the steps of method 300. In these or other embodiments, one or more of the steps of method 300 can be implemented as one or more computer instructions configured to run at one or more processing devices 101 and configured to be stored at one or more non-transitory computer storage devices 102. Such non-transitory memory storage devices 102 can be part of a computer system such as system 100, relational metadata management system 130, and/or SQL generator 150. The processing device(s) 101 can be similar or identical to the processing device(s) 101 described above with respect to computer system 100 and/or relational metadata management system 130.

Metadata may be loaded or modified by any allowable database operation. FIG. 3 illustrates exemplary steps involved in generating a DDL statement 161 or DML statement 162 using the metadata stored in a metadata repository 170. As shown in FIG. 3, a generated DDL statement 161 or DML statement 162 can be constructed from results produced in each step of the generation function.

In block 301, a context for accessing a metadata repository 170 is set or specified. As explained above, the context can be utilized to determined how metadata from a metadata repository 170 will be accessed (e.g., by directly accessing the metadata stored in the metadata repository and/or by indirectly accessing the metadata stored the metadata repository by executing a SQL VIEW statement(s) and/or other appropriate SQL statement(s) on the metadata repository 170).

In block 305, a determination is made as to whether a target object name is set to null. If yes, an error message is generated (block 310) and the error message is returned to the user (block 315), such as by displaying the error message on a computing device 110 being operated by the user.

If the target object name is not null, the method proceeds to block 320. In block 320, a SQL DDL or DML statement type and desired options are created. In some examples, this can include generating a CREATE clause, such as a CREATE VIEW or CREATE TABLE clause, to be included in the SQL statement 160 being generated. In some scenarios, the CREATE clause can be utilized to create a virtual table for a new VIEW, and the CREATE clause can include a name parameter for the VIEW. The options for the SQL DDL or DML can comprise parameters for defining header information to be included in the statement.

Figure 4:
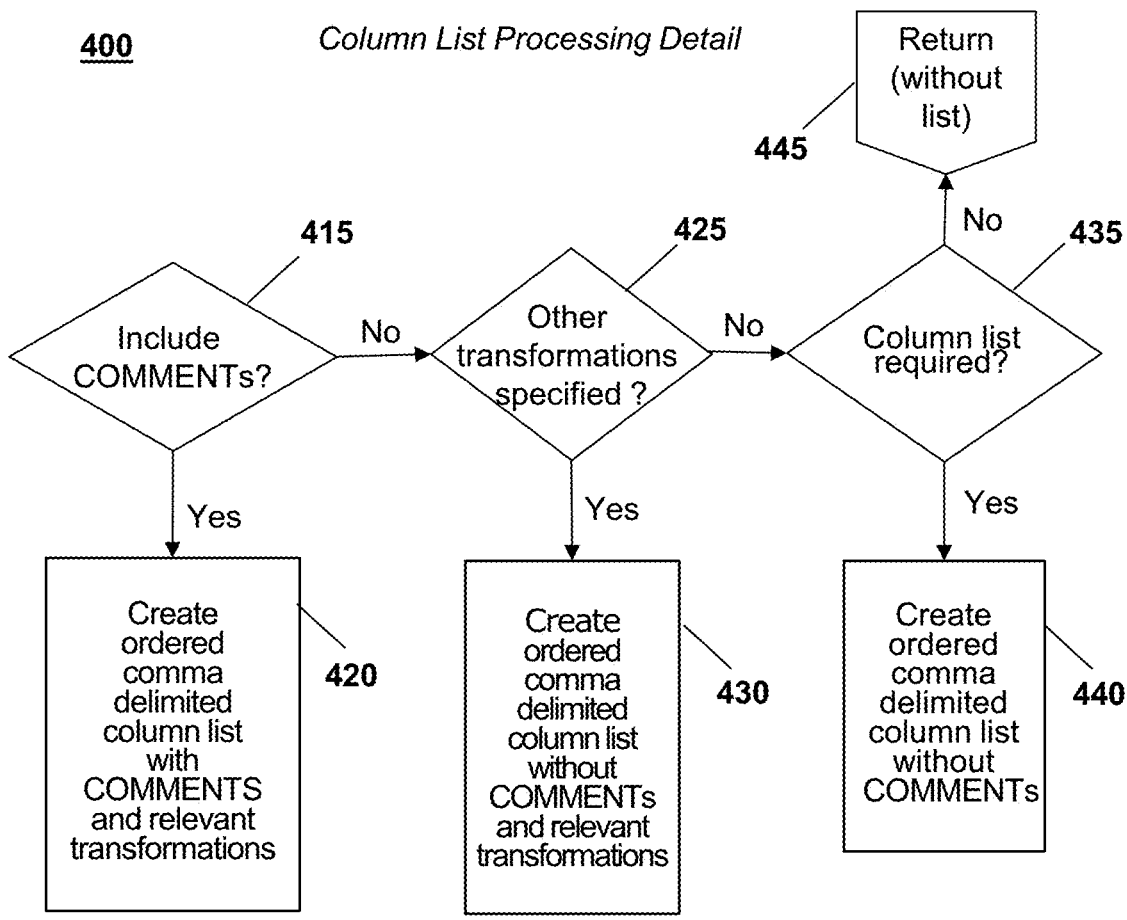
FIG. 4 is a flow chart illustrating an exemplary method for processing column details according to certain embodiments.

Next, in block 325, if a column list is associated with desired SQL statement, the column list can be determined or created. The creation of the column list is optional may not be applicable to all types of statements. In scenarios where a column list is included, the column list can identify the columns to be included in the generated SQL statement. The column list can be derived from the information stored in one or more metadata repositories 170. FIG. 4, which is discussed in further details below, describes an exemplary technique for generating the column list.

Next, in block 330, a SELECT query, clause, or statement is generated for the desired SQL statement 160 being generated. In some embodiments, the SELECT query or statement can identify the names of columns included in the column list that are to be retrieved.

Next, in block 335, one or more post SELECT clauses are generated. Each post SELECT clause may represent a parameter that further defines the SELECT query. In some examples, a post SELECT clause can include a FROM clause that identifies tables, VIEWs or other queryable database objects included in a source database, as well as their JOIN conditions. Likewise, a post SELECT clause also can include a WHERE clause that identifies conditions or criteria for filtering rows in the source table, view or other queryable objects. Additional types of post SELECT clauses, such as GROUP BY, ORDER BY, etc. also may be generated.

Next, in block 340, the results in the previous steps are combined (e.g., the SELECT query, FROM clause, WHERE clause and/or other generated clauses can be combined). The results are combined to form the desired SQL statement 160.

Lastly, in block 345, the completed SQL statement 160 (e.g., DDL statement 161 or DML statement 162) is returned. For example, in some instances, a function that initiated the creation of the SQL statement 160 may receive a return result comprising the generated SQL statement 160 (e.g., which may be a DDL statement 161).

Depending on the desired SQL statement 160, one of more of following strings may be produced utilizing the method 300 described above:

1. Header—the DML or DDL SQL statement type, the name of the generated object (if the completed result is a DDL statement 161), optional destination qualification (if the completed result is a DDL statement 161), and desired SQL options for the target DBMS.
2. Column List—This is an ordered list of column names when generating CREATE VIEW DDL or other DDL or DML statements which may require a column list.
3. The columns in the SQL SELECT statement resulting from the transformation function.
4. SQL FROM Clause—FROM CLAUSE containing source RDBMS object and JOINs.
5. Post FROM Clause—additional SQL following the SQL FROM clause, e.g. WHERE, ORDER BY, LIMIT, etc.

Additional strings also may be produced for enhanced usability or functionality.

In some embodiments, the generation of the SQL statement 160 (e.g., as described above with respect to method 300) is performed by invoking a generation function specified in a software code or instructions. The generation function can enable the SQL statement 160 to be generated according to one or more of the following options:

1. Use the Target Object Definitions SOURCE_DATA_OBJECTs, optionally qualified by their associated Default Database and Default Schema, as the objects in the FROM clause and provide optional inputs specifying SQL clauses that follow the FROM clause. Additional inputs for options for the Post From clause may be provided.
2. Generate the DDL or DML with arguments specifying the FROM and Post FROM clauses.
3. Optionally generate the column list with COMMENTs.
4. Generate the SELECT clause column using the transformation specified in the desired Metadata Repository.
5. For option #1, append the Post From argument.
6. For option #2, append the supplied FROM and Post FROM arguments.

The result, if no errors are encountered, is a complete, executable SQL DDL or DML statement.

Below is an exemplary CREATE VIEW DDL statement that may be generated based on the metadata repository illustrated in FIG. 2A with a default FROM clause. Source objects are from CHINOOK database physical tables.

```
CREATE VIEW
    "VW_CUSTOMER_BASE"
    (
        "CustomerId" COMMENT $$'Primary key for Customer data'$$,
        "FirstName",
        "LastName",
        "Company",
        "Address",
        "City",
        "State",
        "Country",
        "PostalCode",
        "Phone",
        "Fax",
        "Email",
        "SupportRepId"
    )
    AS
SELECT
    "CHINOOK"."CHINOOK_PHYSICAL_
        SCHEMA" ."Customer"."CustomerId" AS "CustomerId",
    "CHINOOK"."CHINOOK_PHYSICAL_
        SCHEMA" ."Customer"."FirstName" AS "FirstName",
```

"CHINOOK"."CHINOOK_PHYSICAL_ SCHEMA" ."Customer"."LastName" AS "LastName",
"CHINOOK"."CHINOOK_PHYSICAL_ SCHEMA" ."Customer"."Company" AS "Company",
"CHINOOK"."CHINOOK_PHYSICAL_ SCHEMA"."Customer"."Address" AS "Address",
"CHINOOK"."CHINOOK_PHYSICAL_ SCHEMA"."Customer"."City" AS "City",
"CHINOOK"."CHINOOK_PHYSICAL_ SCHEMA"."Customer"."State" AS "State",
"CHINOOK"."CHINOOK_PHYSICAL_ SCHEMA"."Customer"."Country" AS "Country",
"CHINOOK"."CHINOOK_PHYSICAL_ SCHEMA"."Customer"."PostalCode" AS "PostalCode",
"CHINOOK"."CHINOOK_PHYSICAL_ SCHEMA"."Customer"."Phone" AS "Phone",
"CHINOOK"."CHINOOK_PHYSICAL_ SCHEMA"."Customer"."Fax" AS "Fax",
"CHINOOK"."CHINOOK_PHYSICAL_ SCHEMA"."Customer"."Email" AS "Email",
"CHINOOK"."CHINOOK_PHYSICAL_ SCHEMA"."Customer"."SupportRepId" AS "SupportRepId"
FROM
"CHINOOK"."CHINOOK_PHYSICAL_ SCHEMA"."Customer";

Below is another exemplary SQL SELECT DML statement that can be generated based on the metadata repository illustrated in FIG. 2A with a default FROM clause. Source objects are from CHINOOK database physical tables.
SELECT
"CHINOOK"."CHINOOK_PHYSICAL_ SCHEMA"."Customer"."CustomerId" AS "CustomerId",
"CHINOOK"."CHINOOK_PHYSICAL_ SCHEMA"."Customer"."FirstName" AS "FirstName",
"CHINOOK"."CHINOOK_PHYSICAL_ SCHEMA"."Customer"."LastName" AS "LastName",
"CHINOOK"."CHINOOK_PHYSICAL_ SCHEMA"."Customer"."Company" AS "Company",
"CHINOOK"."CHINOOK_PHYSICAL_ SCHEMA"."Customer"."Address" AS "Address",
"CHINOOK"."CHINOOK_PHYSICAL_ SCHEMA"."Customer"."City" AS "City",
"CHINOOK"."CHINOOK_PHYSICAL_ SCHEMA"."Customer"."State" AS "State",
"CHINOOK"."CHINOOK_PHYSICAL_ SCHEMA"."Customer"."Country" AS "Country",
"CHINOOK"."CHINOOK_PHYSICAL_ SCHEMA"."Customer"."PostalCode" AS "PostalCode",
"CHINOOK"."CHINOOK_PHYSICAL_ SCHEMA"."Customer"."Phone" AS "Phone",
"CHINOOK"."CHINOOK_PHYSICAL_ SCHEMA"."Customer"."Fax" AS "Fax",
"CHINOOK"."CHINOOK_PHYSICAL_ SCHEMA"."Customer"."Email" AS "Email",
"CHINOOK"."CHINOOK_PHYSICAL_ SCHEMA"."Customer"."SupportRepId" AS "SupportRepId"
FROM
"CHINOOK"."CHINOOK_PHYSICAL_ SCHEMA"."Customer";

Below is an exemplary CREATE VIEW DDL statement that may be utilized to generate a layered view with name transformations based on the metadata repository illustrated in FIG. 2B with a default FROM clause. Source objects are from generated VIEWs in the CHINOOK database VIEWs schema.
CREATE VIEW "VW_CUSTOMER_NL"
("CUSTOMERID" COMMENT $$'Primary key for Customer data'$$,
"First Name",
"Last Name",
"Company",
"Address",
"City",
"State",
"Country",
"Postal Code",
"Phone",
"Fax",
"Email",
"SUPPORTREPID") AS
SELECT
"CHINOOK_VIEWS_DB"."CHINOOK_VIEWS_SCHEMA"."VW_CUSTOMER_BASE"."CustomerId" AS "CUSTOMERID",
"CHINOOK_VIEWS_DB"."CHINOOK_VIEWS_SCHEMA"."VW_CUSTOMER_BASE"."FirstName" AS "First Name",
"CHINOOK_VIEWS_DB"."CHINOOK_VIEWS_SCHEMA"."VW_CUSTOMER_BASE"."LastName" AS "Last Name",
"CHINOOK_VIEWS_DB"."CHINOOK_VIEWS_SCHEMA"."VW_CUSTOMER_BASE"."Company" AS "Company",
"CHINOOK_VIEWS_DB"."CHINOOK_VIEWS_SCHEMA"."VW_CUSTOMER_BASE"."Address" AS "Address",
"CHINOOK_VIEWS_DB"."CHINOOK_VIEWS_SCHEMA"."VW_CUSTOMER_BASE"."City" AS "City",
"CHINOOK_VIEWS_DB"."CHINOOK_VIEWS_SCHEMA"."VW_CUSTOMER_BASE"."State" AS "State",
"CHINOOK_VIEWS_DB"."CHINOOK_VIEWS_SCHEMA"."VW_CUSTOMER_BASE"."Country" AS "Country",
"CHINOOK_VIEWS_DB"."CHINOOK_VIEWS_SCHEMA"."VW_CUSTOMER_BASE"."PostalCode" AS "Postal Code",
"CHINOOK_VIEWS_DB"."CHINOOK_VIEWS_SCHEMA"."VW_CUSTOMER_BASE"."Phone" AS "Phone",
"CHINOOK_VIEWS_DB"."CHINOOK_VIEWS_SCHEMA"."VW_CUSTOMER_BASE"."Fax" AS "Fax",
"CHINOOK_VIEWS_DB"."CHINOOK_VIEWS_SCHEMA"."VW_CUSTOMER_BASE"."Email" AS "Email",
"CHINOOK_VIEWS_DB"."CHINOOK_VIEWS_SCHEMA"."VW_CUSTOMER_BASE"."SupportRepId" AS "SUPPORTREPID"
FROM
"CHINOOK_VIEWS_DB"."CHINOOK_VIEWS_SCHEMA"."VW_CUSTOMER_BASE";

Below is an exemplary CREATE VIEW DDL statement that may be utilized to generate a layered view with expressions based on the metadata repository illustrated in FIG. 2C with a default FROM clause. Source objects are from generated VIEWs in CHINOOK database VIEWs schema.

```
CREATE VIEW
   "VW_INVOICE_METRICS"
   ("Total Sales",
   "Avg. Invoice Sale",
   "Largest nvoice Sale",
   "Smallest Invoice Sale")
   AS
SELECT
   SUM("Total") AS "Total Sales",
   CAST(AVG("Total") AS NUMERIC(10,2) AS "Avg.
      Invoice Sale",
   MAX("Total") AS "Largest nvoice Sale",
   MIN("Total") AS "Smallest Invoice Sale"
FROM
   "CHINOOK_VIEWS_DB"."CHINOOK_VIEWS_S-
      CHEMA"."VW_INVOICE_NL";
```

Another sample from FIG. 2C, generated SELECT with POST_FROM clause (GROUP BY):

```
SELECT
   SUM("Total") AS "Total Sales",
   CAST(AVG("Total") AS NUMERIC(10,2) AS "Avg.
      Invoice Sale",
   MAX("Total") AS "Largest nvoice Sale",
   MIN("Total") AS "Smallest Invoice Sale"
FROM
   "CHINOOK_VIEWS_DB"."CHINOOK_VIEWS_S-
      CHEMA"."VW_INVOICE_NL"
GROUP BY CUSTOMERID;
```

Below is an exemplary CREATE VIEW DDL statement that may be utilized to generate a layered view from multiple sources using a non-default FROM clause with TABLE_ALIAS attribute based on the metadata repository illustrated in FIG. 2D. Source objects are from generated VIEWs in CHINOOK database VIEWs schema.

```
CREATE VIEW
   "VW_CUSTOMER_INVOICE"
   (
      "CUSTOMERID" COMMENT $$'Primary key for
         Customer data'$$,
      "First Name",
      "Last Name",
      "Company",
      "Address",
      "City"
      "State",
      "Country",
      "Postal Code",
      "Phone",
      "Fax"
      "Email",
      "SUPPORTREPID",
      "INVOICEID" COMMENT $$'Primary key for
         Invoice data'$$,
      "Invoice Date",
      "Billing Address",
      "Billing City",
      "Billing State",
      "Billing Country",
      "Billing Postal Code",
      "Total"
   )
   AS
SELECT
   CUST."CUSTOMERID" AS "CUSTOMERID",
   CUST."First Name" AS "First Name",
   CUST."Last Name" AS "Last Name",
   CUST."Company" AS "Company",
   CUST."Address" AS "Address",
   CUST."City" AS "City",
   CUST."State" AS "State",
   CUST."Country" AS "Country",
   CUST."Postal Code" AS "Postal Code",
   CUST."Phone" AS "Phone",
   CUST."Fax" AS "Fax",
   CUST."Email" AS "Email",
   CUST."SUPPORTREPID" AS "SUPPORTREPID",
   INV."INVOICEID" AS "INVOICEID",
   INV."Invoice Date" AS "Invoice Date",
   INV."Billing Address" AS "Billing Address",
   INV."Billing City" AS "Billing City",
   INV."Billing State" AS "Billing State",
   INV."Billing Country" AS "Billing Country",
   INV."Billing Postal Code" AS "Billing Postal Code",
   INV."Total" AS "Total"
FROM
   "CHINOOK_VIEWS_DB"."CHINOOK_VIEWS_S-
      CHEMA"."VW_CUSTOMER_NL
   " AS CUST
   JOIN
      "CHINOOK_VIEWS_DB"."CHINOOK_VIEWS_S-
         CHEMA"."VW_INVOICE_NL" AS INV
      ON CUST.CUSTOMERID=INV.CUSTOMERID;
```

The exemplary SQL statements 160 shown above are intended to illustrate examples of outputs that may be generated by the SQL generator 150 and/or RMMS system 130 using the techniques described herein. However, it should be understood that the SQL generator 150 and/or RMMS system 130 can output a wide variety of different SQL statements based on the desired intent of the user.

FIG. 4 illustrates a flow chart for an exemplary method 400 for processing columns to generate a column list for a SQL statement that potentially requires a column list, e.g., a VIEW, according to certain embodiments. Method 400 is merely exemplary and is not limited to the embodiments presented herein. Method 400 can be employed in many different embodiments or examples not specifically depicted or described herein. In some embodiments, the steps of method 400 can be performed in the order presented. In other embodiments, the activities of method 400 can be performed in any suitable order. In still other embodiments, one or more of the steps of method 400 can be combined or skipped. In many embodiments, system 100, relational metadata management system 130, and/or SQL generator 150 can be configured to perform method 400 and/or one or more of the steps of method 400. In these or other embodiments, one or more of the steps of method 400 can be implemented as one or more computer instructions configured to run at one or more processing devices 101 and configured to be stored at one or more non-transitory computer storage devices 102. Such non-transitory memory storage devices 102 can be part of a computer system such as system 100, relational metadata management system 130, and/or SQL generator 150. The processing device(s) 101 can be similar or identical to the processing device(s) 101 described above with respect to computer system 100 and/or relational metadata management system 130.

In certain embodiments, the method 400 of FIG. 4 may be executed to generate the column list in block 325 of FIG. 3.

As explained above, the context can be utilized to determine how metadata 171 from a metadata repository 170 will be accessed (e.g., by directly accessing the metadata stored in the metadata repository and/or by indirectly accessing the metadata stored the metadata repository by executing a SQL VIEW statement(s) and/or other appropriate SQL statement(s) on the metadata repository 170).

In block 415, a determination is made regarding whether or not to create a column list with COMMENTS (e.g., by adding COMMENT statements that provide information describing columns and/or corresponding objects). If comments are to be included with the column listing, the method proceeds to block 420 and a column list is generated with comments and relevant transformations (e.g., such as the name, semantic, and constant transformations described above). In some embodiments, the column list may be created as an order listing of columns that are comma delimited, and corresponding COMMENTS and transformations may be applied to the listing.

If comments are not to be included with the column listing, the method proceeds to block 425. In block 425, a determination is made regarding whether or not any transformations have been specified for the column list. If one or more transformations have been specified, the method proceeds to block 430. In block 430, the column list may be created as an order listing of columns that are comma delimited without COMMENTS, and the specified transformations may be applied to the column listing. If one or more transformations have not been specified, the method proceeds to block 435.

In block 435, a determination is made regarding whether or not a column list is required. In some instances, a column list may not be required to generate certain VIEW objects. If a column list is required, the method proceeds to block 440 and the column list may be created as an order listing of columns that are comma delimited, without any corresponding COMMENTS and without applying any transformations. If a column list is not required, the method proceeds to block 445 and no column list is returned or provided.

Figure 5:
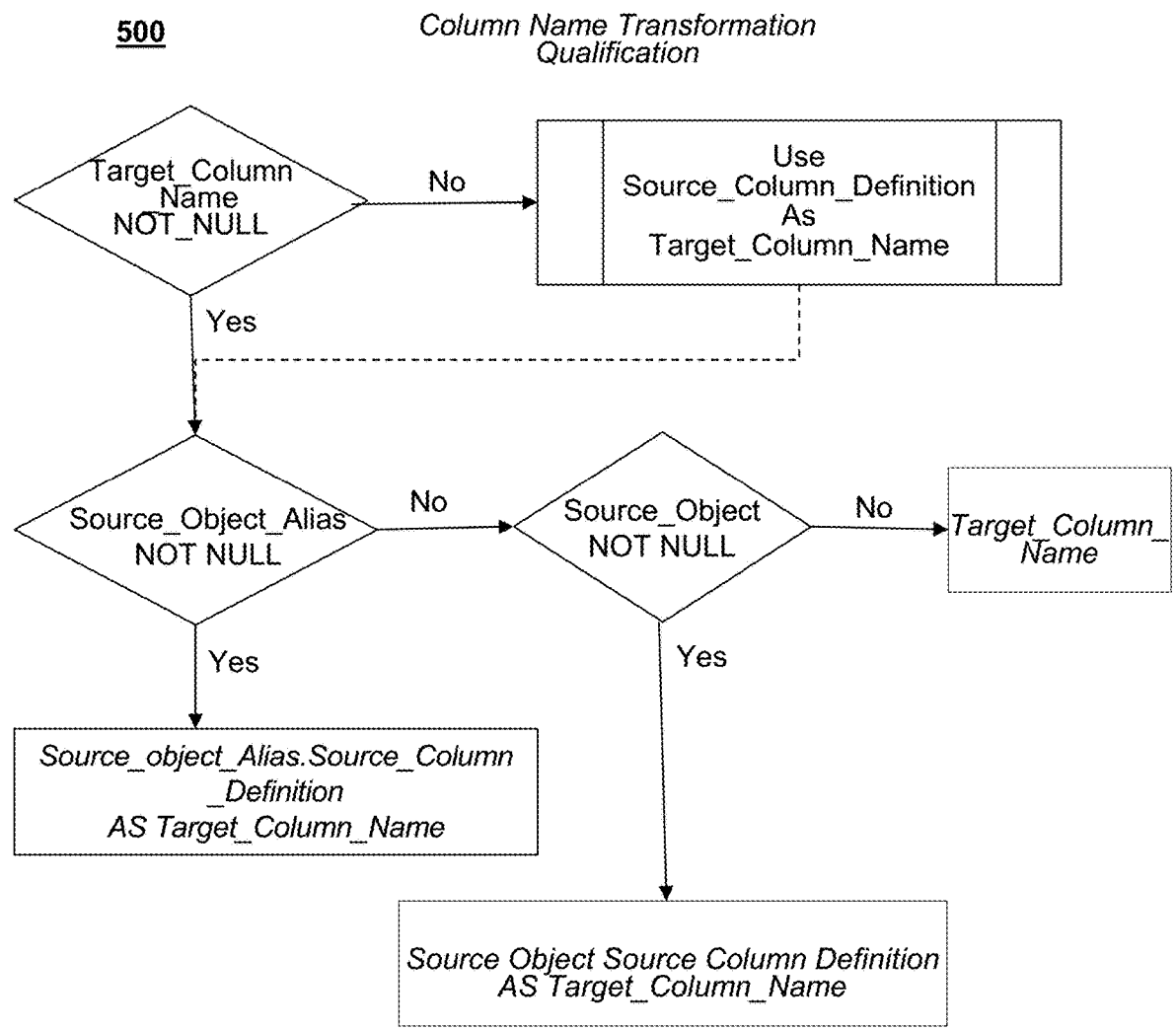
FIG. 5 is a flow chart illustrating an exemplary method for qualifying a column name transformation according to certain embodiments.

FIG. 5 illustrates a flow chart for an exemplary method 500 for qualifying a column name transformation according to certain embodiments. Method 500 is merely exemplary and is not limited to the embodiments presented herein. Method 500 can be employed in many different embodiments or examples not specifically depicted or described herein. In some embodiments, the steps of method 500 can be performed in the order presented. In other embodiments, the activities of method 500 can be performed in any suitable order. In still other embodiments, one or more of the steps of method 500 can be combined or skipped. In many embodiments, system 100, relational metadata management system 130, and/or SQL generator 150 can be configured to perform method 500 and/or one or more of the steps of method 500. In these or other embodiments, one or more of the steps of method 500 can be implemented as one or more computer instructions configured to run at one or more processing devices 101 and configured to be stored at one or more non-transitory computer storage devices 102. Such non-transitory memory storage devices 102 can be part of a computer system such as system 100, relational metadata management system 130, and/or SQL generator 150. The processing device(s) 101 can be similar or identical to the processing device(s) 101 described above with respect to computer system 100 and/or relational metadata management system 130.

FIG. 5 illustrates steps of column name transformation processing. As shown in FIG. 5, each row in the metadata repository with an appropriate transformation type produces a column definition in the resulting SQL.

1. The standard SQL convention for a SQL SELECT statement is:
   [Qualification].<column_definition>[AS]<column_name>
   "Qualification" may be either a SQL Table Alias (Source_Object_Alias) or a database Object (Source_Data_Object)_ (FIG. 4)
2. The Standard SQL convention for a column in a SQL Column List is:
   <column_name>[COMMENT <string literal>] (FIG. 3)

Items in brackets ([ ]) are optional.
The column_definition may be one of:
1. The name of a column from a database object
2. A literal
3. A SQL expression such as a computation, function call, semi-structured path definition, etc.

Other types of column definitions also may be utilized which are not explicitly mentioned above.

If a FROM Argument is supplied, the text is used as the SQL FROM clause. The text may contain any valid SQL, including additional clauses such as GROUP BY, ORDER BY, etc.

If a FROM Argument is not supplied, the qualified source object names are used to build the FROM clause.

If a POST FROM Argument is supplied, it is appended to the results of the prior steps.

In certain embodiments, a method is disclosed. The method can implemented via execution of computing instructions configured to run at one or more processing devices and configured to be stored on non-transitory computer-readable media. The method comprises: providing a relational metadata management system (RMMS) that is configured to generate structured query language (SQL) statements for one or more databases; creating, by the RMMS, at least one metadata repository corresponding to the one or more databases, wherein the at least one metadata repository stores metadata that defines one or more target objects based on one or more object transformations that are applied to at least one source object included in the one or more databases, and the RMMS is adapted to permit serial reusage of the metadata included in the at least one metadata repository to define the one or more target objects; and generating, by the RMMS, at least one SQL statement based, at least in part, on the metadata corresponding to the one or more target objects included in the at least one metadata repository.

In certain embodiments, a system is disclosed. The system comprises one or more processors and one or more non-transitory computer-readable storage devices storing computing instructions. Execution of the computing instructions by the one or more processors cause the one or more processors to execute functions comprising: providing a relational metadata management system (RMMS) that is configured to generate structured query language (SQL) statements for one or more databases; creating, by the RMMS, at least one metadata repository corresponding to the one or more databases, wherein the at least one metadata repository stores metadata that defines one or more target objects based on one or more object transformations that are applied to at least one source object included in the one or more databases, and the RMMS is adapted to permit serial reusage of the metadata included in the at least one metadata repository to define the one or more target objects; and generating, by the RMMS, at least one SQL statement based, at least in part, on the metadata corresponding to the one or more target objects included in the at least one metadata repository.

In certain embodiments, a computer program product is disclosed. The computer program product comprises one or more non-transitory computer-readable media storing instructions for causing a computing device to: provide a relational metadata management system (RMMS) that is configured to generate structured query language (SQL) statements for one or more databases; create, by the RMMS, at least one metadata repository corresponding to the one or more databases, wherein the at least one metadata repository stores metadata that defines one or more target objects based on one or more object transformations that are applied to at least one source object included in the one or more databases, and the RMMS is adapted to permit serial reusage of the metadata included in the at least one metadata repository to define the one or more target objects; and generate, by the RMMS, at least one SQL statement based, at least in part, on the metadata corresponding to the one or more target objects included in the at least one metadata repository.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Additionally, while various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A method implemented via execution of computing instructions configured to run at one or more processing devices and configured to be stored on non-transitory computer-readable media, the method comprising:
providing, by the one or more processing devices, a relational metadata management system (RMMS) that is configured to generate structured query language (SQL) statements for one or more databases;
creating, by the RMMS, at least one metadata repository corresponding to the one or more databases, wherein the at least one metadata repository stores metadata that defines one or more target objects based on one or more object transformations that are applied to at least one source object included in the one or more databases, and the RMMS permits serial reusage of the metadata included in the at least one metadata repository to define the one or more target objects;
transforming, based on the one or more object transformations applied to the at least one source object, a source column name for the at least one source object to a target column name for a target object; and generating, by the RMMS, at least one SQL statement based, at least in part, on the serial reusage of metadata corresponding to the one or more target objects included in the at least one metadata repository, wherein the generating the at least one SQL statement includes:
combining a CREATE clause, a SELECT clause, and at least one post SELECT clause to form the at least one SQL statement; and
in response to determining that a column list is needed for generating a view based on the CREATE clause, generating the column list and combining the column list with the CREATE clause, the SELECT clause, and the at least one post SELECT clause to form the at least one SQL statement, wherein the column list includes the target column name,
wherein the generating the at least one SQL statement further includes three or more of following operations:
setting a context for accessing the metadata in the at least one metadata repository;
accessing the at least one metadata repository to generate the CREATE clause for the at least one SQL statement;
determining if the column list is needed for generating the at least one SQL statement;
accessing the at least one metadata repository to generate the SELECT clause for the at least one SQL statement; and
accessing the at least one metadata repository to generate the at least one post SELECT clause for the at least one SQL statement.

2. The method of claim 1, wherein serially reusing the metadata to define the one or more target objects includes:
storing metadata that defines a first target object derived, at least in part, from the one or more object transformations performed on the source object included in the one or more databases; and
storing metadata that defines a second target object that is derived, at least in part, from the first target object.

3. The method of claim 2, wherein the RMMS enables the at least one SQL statement to be generated based, at least in part, on the metadata corresponding to the second target object.

4. The method of claim 1, wherein the at least one SQL statement generated by the RMMS includes a data definition language (DDL) statement or a data manipulation language (DML) statement.

5. The method of claim 1, wherein the metadata included in the at least one metadata repository defines the one or more object transformations including:
a name transformation that transforms a column name for the at least one source object to a target column name; and
a semantic transformation that transforms content of a source column definition to a target column name.

6. The method of claim 5, wherein the one or more object transformations defined by the metadata included in the at least one metadata repository further include:
a column transformation performed between target columns in the at least one SQL statement and a source column definition associated with the source object; and
a constant transformation that transforms a constant included in a source column definition to a target column name.

7. The method of claim 1, wherein generating the at least one SQL statement includes specifying the context for accessing the metadata stored in the at least one metadata repository, and the context includes one of:
directly accessing the metadata stored in the at least one metadata repository to generate the at least one SQL statement; and
indirectly accessing the metadata stored in the at least one metadata repository via at least one VIEW derived from the metadata repository.

8. A system comprising:
one or more processors; and
one or more non-transitory computer-readable storage devices storing computing instructions, wherein execution of the computing instructions by the one or more processors causes the one or more processors to execute functions comprising:
providing, by the one or more processors, a relational metadata management system (RMMS) that is configured to generate structured query language (SQL) statements for one or more databases;
creating, by the RMMS, at least one metadata repository corresponding to the one or more databases, wherein the at least one metadata repository stores metadata that defines one or more target objects based on one or more object transformations that are applied to at least one source object included in the one or more databases, and the RMMS permits serial reusage of the metadata included in the at least one metadata repository to define the one or more target objects;
transforming, based on the one or more object transformations applied to the at least one source object, a source column name for the at least one source object to a target column name for a target object; and
generating, by the RMMS, at least one SQL statement based, at least in part, on the serial reusage of metadata corresponding to the one or more target objects included in the at least one metadata repository, wherein the generating the at least one SQL statement includes:
combining a CREATE clause, a SELECT clause, and at least one post SELECT clause to form the at least one SQL statement; and
in response to determining that a column list is needed for generating a view based on the CREATE clause, generating the column list and combining the column list with the CREATE clause, the SELECT clause, and the at least one post SELECT clause to form the at least one SQL statement, wherein the column list includes the target column name;
wherein the generating the at least one SQL statement further includes three or more of following operations:
setting a context for accessing the metadata in the at least one metadata repository;
accessing the at least one metadata repository to generate the CREATE clause for the at least one SQL statement;
determining if the column list is needed for generating the at least one SQL statement;
accessing the at least one metadata repository to generate the SELECT clause for the at least one SQL statement; and accessing the at least one metadata repository to generate the at least one post SELECT clause for the at least one SQL statement.

9. The system of claim 8, wherein serially reusing the metadata to define the one or more target objects includes:
   storing metadata that defines a first target object derived, at least in part, from the one or more object transformations performed on the source object included in the one or more databases; and
   storing metadata that defines a second target object that is derived, at least in part, from the first target object.

10. The system of claim 9, wherein the RMMS enables the at least one SQL statement to be generated based, at least in part, on the metadata corresponding to the second target object.

11. The system of claim 8, wherein the at least one SQL statement generated by the RMMS includes a data definition language (DDL) statement or a data manipulation language (DML) statement.

12. The system of claim 8, wherein the metadata included in the at least one metadata repository defines the one or more object transformations including:
   a name transformation that transforms a column name for the at least one source object to a target column name; and
   a semantic transformation that transforms content of a source column definition to a target column name.

13. The system of claim 12, wherein the one or more object transformations defined by the metadata included in the at least one metadata repository further include:
   a column transformation performed between target columns in the at least one SQL statement and a source column definition associated with the source object; and
   a constant transformation that transforms a constant included in a source column definition to a target column name.

14. The system of claim 8, wherein generating the at least one SQL statement includes specifying the context for accessing the metadata stored in the at least one metadata repository, and the context includes one of:
   directly accessing the metadata stored in the at least one metadata repository to generate the at least one SQL statement; and
   indirectly accessing the metadata stored in the at least one metadata repository via at least one VIEW derived from the metadata repository.

15. A computer program product, the computer program product comprising one or more non-transitory computer-readable media including instructions for causing a computing device to:
   provide, by the computing device, a relational metadata management system (RMMS) that is configured to generate structured query language (SQL) statements for one or more databases;
   creating, by the RMMS, at least one metadata repository corresponding to the one or more databases, wherein the at least one metadata repository stores metadata that defines one or more target objects based on one or more object transformations that are applied to at least one source object included in the one or more databases, and the RMMS permits serial reusage of the metadata included in the at least one metadata repository to define the one or more target objects;
   transforming, based on the one or more object transformations applied to the at least one source object, a source column name for the at least one source object to a target column name for a target object; and
   generating, by the RMMS, at least one SQL statement based, at least in part, on the serial reusage of metadata corresponding to the one or more target objects included in the at least one metadata repository, wherein the generating the at least one SQL statement includes:
      combining a CREATE clause, a SELECT clause, and at least one post SELECT clause to form the at least one SQL statement; and
      in response to determining that a column list is needed for generating a view based on the CREATE clause, generating the column list and combining the column list with the CREATE clause, the SELECT clause, and the at least one post SELECT clause to form the at least one SQL statement, wherein the column list includes the target column name,
      wherein the generating the at least one SQL statement further includes three or more of following operations:
         setting a context for accessing the metadata in the at least one metadata repository;
         accessing the at least one metadata repository to generate the CREATE clause for the at least one SQL statement;
         determining if the column list is needed for generating the at least one SQL statement;
         accessing the at least one metadata repository to generate the SELECT clause for the at least one SQL statement; and
         accessing the at least one metadata repository to generate the at least one post SELECT clause for the at least one SQL statement.

16. The computer program product of claim 15, wherein serially reusing the metadata to define the one or more target objects includes:
   storing metadata that defines a first target object derived, at least in part, from the one or more object transformations performed on the source object included in the one or more databases; and
   storing metadata that defines a second target object that is derived, at least in part, from the first target object.

* * * * *